United States Patent
Chen

(10) Patent No.: US 10,332,281 B2
(45) Date of Patent: Jun. 25, 2019

(54) SYSTEM AND METHOD FOR DENOISING MEDICAL IMAGES BY ENFORCING LOW RANK SPATIAL-TEMPORAL OR SPATIAL-SPECTRAL IMAGE MATRICES

(71) Applicant: Wisconsin Alumni Research Foundation, Madison, WI (US)

(72) Inventor: Guang-Hong Chen, Madison, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 0 days.

(21) Appl. No.: 15/011,107

(22) Filed: Jan. 29, 2016

(65) Prior Publication Data

US 2017/0221234 A1   Aug. 3, 2017

(51) Int. Cl.
| | |
|---|---|
| *G06T 5/00* | (2006.01) |
| *G06T 11/00* | (2006.01) |
| *G06T 5/50* | (2006.01) |
| *G06T 5/10* | (2006.01) |

(52) U.S. Cl.
CPC ............ *G06T 11/008* (2013.01); *G06T 5/002* (2013.01); *G06T 5/10* (2013.01); *G06T 5/50* (2013.01); *G06T 2207/10081* (2013.01); *G06T 2207/20182* (2013.01); *G06T 2211/404* (2013.01); *G06T 2211/412* (2013.01); *G06T 2211/424* (2013.01)

(58) Field of Classification Search
CPC ......... G06T 5/002; G06T 5/50; G06T 11/008; G06T 2207/10081; G06T 2207/20182; G06T 2211/404
See application file for complete search history.

(56) References Cited

U.S. PATENT DOCUMENTS

| | | | | | |
|---|---|---|---|---|---|
| 5,546,472 | A | * | 8/1996 | Levin | G01R 33/5608 382/131 |
| 6,009,208 | A | * | 12/1999 | Mitra | G06K 9/40 382/128 |
| 7,795,869 | B1 | * | 9/2010 | Bydder | G01R 33/482 324/307 |
| 2009/0010515 | A1 | * | 1/2009 | Sinop | G01R 33/5611 382/131 |
| 2009/0290806 | A1 | * | 11/2009 | Lelescu | G06T 5/10 382/254 |

(Continued)

OTHER PUBLICATIONS

Loan ("The Kronecker product SVD," Lecture Note, Cornell University, 2009. Downloaded from https://www.cs.cornell.edu/cv/ResearchPDF/KSVD.pdf on Jan. 20, 2018).*

(Continued)

*Primary Examiner* — Yubin Hung
(74) *Attorney, Agent, or Firm* — Quarles & Brady LLP

(57) ABSTRACT

Systems and methods for generating one or more denoised images from a series of noisy images acquired with a medical imaging system are described. In general, the systems and methods described here implement techniques whereby the series of noisy images are formed into a spatial-temporal or spatial-spectral image matrix in which each column represents a different noisy image. The image matrix is then processed to decompose the image matrix into basis images defined by a spatial and a temporal or spectral basis. Low rank solutions are enforced and extracted from the resulting decomposed image matrix as denoised images.

18 Claims, 7 Drawing Sheets

(56) References Cited

U.S. PATENT DOCUMENTS

| | | | | |
|---|---|---|---|---|
| 2013/0182930 A1* | 7/2013 | Trzasko | ............... | G06T 11/003 382/131 |
| 2014/0062481 A1* | 3/2014 | Greiser | ................. | G01R 33/56 324/309 |
| 2014/0334701 A1* | 11/2014 | Ye | ......................... | G06T 11/006 382/131 |
| 2015/0224346 A1* | 8/2015 | Coviello | ............ | G01S 7/52047 600/439 |
| 2015/0280802 A1* | 10/2015 | Thomas | .............. | H04L 27/2636 370/312 |
| 2016/0048951 A1* | 2/2016 | Zhang | ................. | H04N 19/597 382/254 |

OTHER PUBLICATIONS

Lin et al. ("Denoising Multi-Channel Images in Parallel MRI by Low Rank Matrix Decomposition," IEEE Transactions on Applied Superconductivity, vol. 24, Iss. 5, Oct. 2014 ).*

Lin et al. ("Denoising Multi-Channel Images in Parallel MRI by Low Rank Matrix Decomposition," IEEE Transactions on Applied Superconductivity, vol. 24, Iss. 5, Oct. 2014) (Year: 2014).*

Barzigar et al. ("Removing Mixture Noise from Medical Images Using Block Matching Filtering and Low-Rank Matrix Completion," IEEE Second International Conference on Healthcare Informatics, Imaging and Systems Biology, 2012) (Year: 2012).*

Roozgard et al. ("An efficient video denoising method using decomposition approach for low-rank matrix completion," The 46th Asilomar Conference on Signals, Systems and Computers, Nov. 2012) (Year: 2012).*

Wen et al. ("Solving a low-rank factorization model for matrix completion by a nonlinear successive over-relaxation algorithm," Mathematical Programming Computing, vol. 4, No. 4, Dec. 2012) (Year: 2012).*

Ma et al. ("Fixed point and Bregman iterative methods for matrix rank minimization," Mathematical Programming Computing, Vo. 128, No. 1-2, Jun. 20011) (Year: 2011).*

Chen, et al., Synchronized Multiartifact Reduction with Tomographic Reconstruction (SMART-RECON): A Statistical Model Based Iterative Image Reconstruction Method to Eliminate Limited-View Artifacts and to Mitigate the Temporal-Average Artifacts in Time-Resolved CT, Medical Physics, 2015, 42(8):4698-4707.

Elad, On the Origin of the Bilateral Filter and Ways to Improve It, IEEE Transactions on Image Processing, 2002, 11(10):1141-1151.

Li, et al., Low Rank Approximation (LRA) Based Noise Reduction in Spectral-Resolved X-ray Imaging Using Photon Counting Detector, Proc of SPIE, 2015, vol. 9412, 7 pages.

PCT International Search Report and Written Opinion, PCT/US2017/015265, dated Apr. 12, 2017.

* cited by examiner

SYSTEM AND METHOD FOR DENOISING MEDICAL IMAGES BY ENFORCING LOW RANK SPATIAL-TEMPORAL OR SPATIAL-SPECTRAL IMAGE MATRICES

STATEMENT REGARDING FEDERALLY SPONSORED RESEARCH

This invention was made with government support under EB096699 awarded by the National Institutes of Health. The government has certain rights in the invention.

BACKGROUND OF THE INVENTION

The field of the invention is systems and methods for producing lower noise medical images. More particularly, the invention relates to systems and methods for denoising medical images by enforcing low rank in spatial-temporal or spatial-spectral image matrices.

Medical images typically contain an appreciable amount of image noise. In x-ray imaging systems, the amount of noise in an acquired image is related to the x-ray dose used to obtain that image. As the x-ray dose is lowered, the amount of noise in the resultant image increases. Other sources of imaging noise include uncertainties in the acquired data from the medical imaging system, which may be an x-ray imaging system (e.g., a computed tomography system, a C-arm system), an ultrasound system, a magnetic resonance imaging ("MRI") system, and the like.

Although techniques for denoising medical images exist, the currently available techniques often require a trade-off in spatial resolution in the images. Thus, there remains a need for systems and methods for denoising medical images that reduce the noise in the images without decreasing the spatial resolution of the images.

SUMMARY OF THE INVENTION

The present invention overcomes the aforementioned drawbacks by providing a method for generating a series of denoised images of a subject from a series of noisy images acquired with a medical imaging system. The method includes providing a series of noisy images acquired with a medical imaging system to a computer system for processing. A noisy image matrix is formed from the series of noisy images, wherein the noisy image matrix represents a first basis (e.g., a spatial basis) and a second basis (e.g., a temporal or spectral basis). A denoised image matrix is then generated with the computer by inputting the noisy image matrix to a rank-regularized optimization that iteratively minimizes a difference between a denoised image matrix and the noisy image matrix, wherein the rank-regularized optimization includes a regularization term that controls generating the denoised image matrix as a decomposition of the noisy image matrix into basis images defined by the first basis and the second basis. The denoised image matrix contains the at least one denoised image of the subject.

It is another aspect of the invention to provide a method for generating a denoised image of a subject from noisy images acquired with a medical imaging system. The method includes providing a series of noisy images acquired with a medical imaging system to a computer system for processing. An initial image matrix is formed from the series of noisy images by vectorizing each noisy image and concatenating the vectorized noisy images as the initial image matrix, such that each column in the initial image matrix corresponds to a different one of the noisy images. A decomposed image matrix is then generated with the computer system by performing a singular value decomposition on the initial image matrix. The singular value decomposition decomposes the initial image matrix into a weighted sum of basis images such that each column in the decomposed image matrix corresponds to a different basis image weighted by a singular value. Each basis image is represented by a Kronecker product between a first basis (e.g., a spatial basis) and a second basis (e.g., a temporal or spectral basis). The denoised image is then generated with the computer by truncating the decomposed image matrix and storing the truncated image matrix as the denoised image.

The foregoing and other aspects and advantages of the invention will appear from the following description. In the description, reference is made to the accompanying drawings that form a part hereof, and in which there is shown by way of illustration a preferred embodiment of the invention. Such embodiment does not necessarily represent the full scope of the invention, however, and reference is made therefore to the claims and herein for interpreting the scope of the invention.

DETAILED DESCRIPTION OF THE INVENTION

Figure 1:
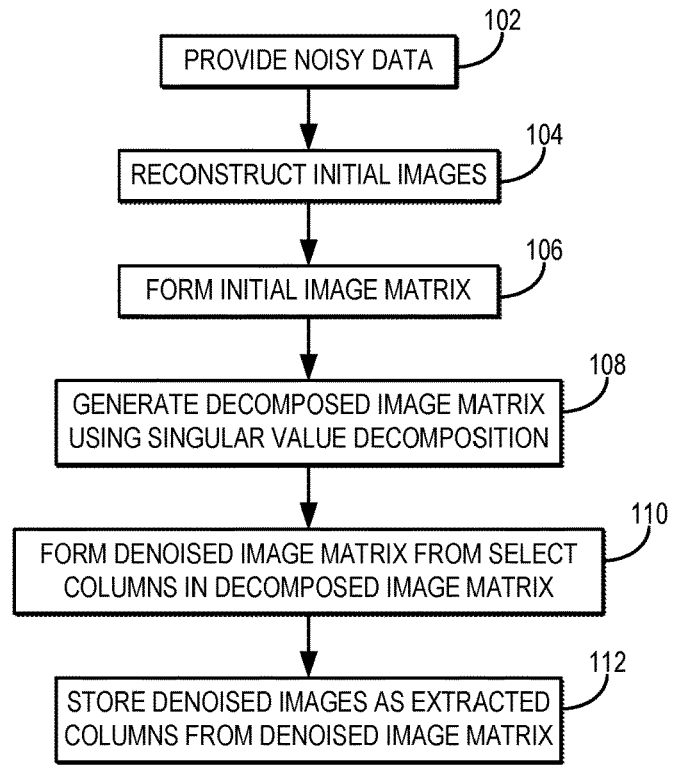
FIG. 1 is a flowchart setting forth the steps of an example method for generating one or more denoised images from a series of noisy images by forming an image matrix representative of a spatial basis and a temporal or spectral basis, decomposing that image matrix, and retaining only selected columns of the decomposed image matrix as those representing denoised images in the spatial basis.

Described here are systems and methods for generating one or more denoised images from a series of noisy images acquired with a medical imaging system. In general, the systems and methods described here implement techniques whereby the series of noisy images are formed into an image matrix in which each column represents a different noisy image. The image matrix is then processed to decompose the image matrix into a Kronecker product of a first basis and second basis. The first basis is generally a spatial basis and the second basis can be a temporal basis or a spectral basis, depending on whether the noisy images represent a time series of image frames or a series of images having different spectral content (e.g., images acquired with an x-ray imaging system at different x-ray energy spectra or different x-ray energy bins).

By enforcing low rank solutions in this decomposed matrix, denoised images can be generated by separating the anatomical and physiological information from noise. As one example, the low rank solutions can be enforced using a singular value decomposition of the image matrix and retaining only those Kronecker product of matrix columns associated with singular values above a threshold value. As another example, the low rank solutions can be enforced using a rank-regularized optimization technique.

A medical image (e.g., an x-ray image or a magnetic resonance image) is a delineation of a spatial distribution of anatomical structures. In clinical applications, quite often the structural changes of anatomy will vary with other potential imaging parameters, such as time, x-ray energy, and magnetic resonance frequency. When a spatial image is considered as an image vector, the addition of these other dimensions of image parameters will lift the spatial image vector to a higher dimensional image matrix, or to an image tensor. However, a lot of redundant information exists in these higher dimensional medical image tensors.

It is an aspect of the present invention to exploit the redundant information in these images to reduce noise dramatically, which can allow for the significant reduction in radiation dose in x-ray imaging because low-noise images can be reconstructed from lower dose acquisitions that would otherwise contain a significant level of noise caused by the lower dose.

As one example, because of the temporal change of the vasculature, the temporal variation of the contrast uptake curve at each image pixel can be fitted into a gamma-variate function with five parameters. This is generally true for all image pixels that are arranged as an image vector. Because the time-resolved angiographic data can be represented in a five parameter space, the intrinsic dimensionality of the time-resolved angiography data will have a low rank when the spatial images are arranged along the temporal direction as a spatial-temporal matrix, despite the fact that a multitude of image frames (i.e., many more than five frames) will be acquired in clinical practice. By enforcing a low-rank requirement of the spatial-temporal image matrix, the noise of the images can be reduced. Using this technique, a twenty-fold radiation dose reduction can be achieved while still generating high quality x-ray images.

Similarly, when the energy dependence of the attenuation coefficients of anatomical structures is taken into account, the image vector is lifted up into a spatial-spectral image matrix. Because the attenuation coefficients include two primary physical processes (photoelectric effect and Compton scattering), the dimensionality of the spatial-spectral attenuation image is reduced down to two, despite the fact that many different images can be acquired at more than two different photon energy spectra or energy levels.

As another example, when using a photon counting detector in an x-ray phase contrast imaging system, because the x-ray phase contrast mechanism only has a single global energy dependent factor, it is contemplated that the rank of the spatial-spectral phase contrast image matrix will have a low rank of one or two. By enforcing a rank-1 or rank-2 condition on the spatial-spectral image matrix, the noise of x-ray phase contrast images acquired at each energy bin can be significantly reduced and thus the SNR of the images acquired at significantly lower radiation dose than used in current clinical practice can be improved for diagnosis or other quantitative analyses.

The systems and methods described here can reduce noise without performing any spatial low-pass filter. Therefore, this the systems and methods described here can reduce noise, improve SNR, and reduce radiation dose without sacrificing spatial resolution, which is distinct from other currently available denoising technologies that have these as trade-offs.

Referring now to FIG. 1, a flowchart is illustrated as setting forth the steps of an example method for reconstructing one or more denoised images of a subject from noisy data acquired with a medical imaging system. In some instances, the medical imaging system can be an x-ray absorption imaging system, an x-ray phase contrast imaging system, or an x-ray dark field imaging system, including their implementations for tomographic acquisitions, such as an x-ray computed tomography ("CT") system, an x-ray C-arm imaging system, an x-ray tomosynthesis system, and so on. As one example, the medical imaging system can be an x-ray C-arm angiographic imaging system and the data can be data acquired before and after a contrast agent was administered to a subject's vasculature. As another example, the medical imaging system can be an x-ray absorption imaging system that implement photon-counting detectors. As still another example, the medical imaging system can be a phase contrast imaging system that implements photon-counting detectors.

The method includes providing noisy data acquired with a medical imaging system, as indicated at step 102. In some embodiments, the noisy data is provided to a computer system by retrieving previously acquired noisy data from a data storage or the like. In some other embodiments, the noisy data is provided to a computer system by acquiring the data with a medical imaging system that is in communication with the computer system. In some instances, noisy images of the subject can be data directly read off a detector, such as a photon-counting detector, or such data that has been corrected for non-ideality of the imaging system, including nonlinearity, gain correction, non-uniform detector response, scatter correction, or has such data that has been processed with a logarithmic transform to improve linearity of the x-ray absorption data.

Noisy images of the subject are reconstructed from the noisy data, as indicated at step 104. This reconstruction can proceed using any suitable image reconstruction technique. It will be appreciated by those skilled in the art that in some embodiments, steps 102 and 104 can be skipped by instead providing to the computer system a series of already reconstructed noisy images, which may be images already stored in a data storage or the like.

In some embodiments, the noisy images can represent a time series of image frames. As one example, the time series of image frames can be a time series of images acquired during an angiographic procedure, such as images acquired both before and after administering a contrast agent to the subject. Such images may be acquired with an x-ray imaging system or with a magnetic resonance imaging ("MRI") system.

In some other embodiments, the noisy images can represent a series of spectrally-resolved images. As one example, the noisy images can be images acquired with an x-ray imaging system at different x-ray energy bins. In this example, the different x-ray energy spectra correspond to different energy bins, with which different ones of the noisy images can be associated. As another example, the noisy images can be spectrally-resolved images acquired with an MRI system.

An initial image matrix is formed from the noisy images by vectorizing the images and arranging them as columns in the initial image matrix, as indicated at step 106. In this instance, each column in the initial image matrix will correspond to a different one of the noisy images and each row in the initial image matrix will correspond to a different spatial location in the imaged field-of-view. If the noisy images represent a time series of image frames, then each column in the initial image matrix will also correspond to a different time frame. Likewise, if the noisy images represent a spectrally-resolved series of images, then each column in the initial image matrix will also correspond to a different spectral bin (e.g., a different x-ray energy level, magnetic resonance frequency). The initial image matrix is thus associated with two bases: a spatial basis and either a temporal basis or a spectral basis.

It will be appreciated by those skilled in the art that in some implementations the initial image matrix can be a tensor formed by converting three-dimensional image matrices into two-dimensional matrices and concatenating them as described above (e.g., such that the spatial information is organized by temporal or spectral bases to form a spatial-temporal tensor or a spatial-spectral tensor).

In some embodiments, the initial image matrix (or initial image tensor) can be augmented with additional, low noise information of the subject. As one example, the initial image matrix can be augmented by reformatting one or more prior images of the subject and concatenating the results as one or more columns to the beginning of the initial image matrix. For instance, the one or more prior images of the subject may be an average of several time frames (e.g., over an entire time series or over various time windows using a sliding window approach) or x-ray energy levels.

In some embodiments, the initial spatial-temporal or spatial-spectral image matrix can be formed from a selected subgroup of image frames from the complete series of noisy images. For instance, some of the noisy images may not contain excessive image noise and, thus, do not need to be denoised.

A decomposed image matrix is then generated by performing a singular value decomposition ("SVD") on the initial image matrix, as indicated at step 108. In general, the SVD decomposes the initial image matrix as follows, $$X(\vec{x}, t) = \sum_{i=1}^{r} \sigma_i B_i(\vec{x}, t) = \sum_{i=1}^{r} \sigma_i(\vec{u}_i(\vec{x}) \otimes \vec{v}_i^T(t)); \quad (1)$$

where the so-called singular value, $\sigma_i$, is the weight for the basis, $B_i(\vec{x},t)$, which can be further decomposed into Kronecker product of a first basis ($\vec{u}_i(\vec{x})$) and a second basis ($\vec{v}_i(t)$). In general, the first basis, $\vec{u}_i(\vec{x})$, is a spatial basis and the second basis, $\vec{v}_i(t)$, will be either a temporal basis or a spectral basis depending on the information content of the noisy images, as described above. When the second basis is a spectral basis, it can be represented as $\vec{v}_i(E)$ if it is associated with an x-ray energy or as $\vec{v}_i(\omega)$ if it is associated with a magnetic resonance frequency. In these instances, the basis images can be represented as $B_i(\vec{x},E)$ or $B_i(\vec{x},\omega)$, respectively.

A denoised image matrix can then be formed by selecting the columns in the decomposed image matrix based on the singular values, $\sigma_i$, in the decomposed image matrix, as indicated at step 110. In some embodiments, the denoised image matrix is formed by selecting a predetermined number of singular values in the decomposed image matrix. As one example, in x-ray phase contrast imaging only the first basis image, $B_1(\vec{x},E)$ can be selected. In other examples, however, up to the first ten or twenty basis images can be summed with the corresponding weight of the singular values, and this sum may be selected as the denoised image. It is contemplated that for time-resolved noisy images, after the first 10-20 basis images, the rest of the basis images in the decomposed image matrix primarily contain noise and thus can be discarded. In some other embodiments, the denoised image matrix is formed by selecting only those basis images in the decomposed image matrix having singular values above a threshold value. As one example, only those basis images with singular values greater than an empirically determined value are selected. The one or more denoised images are then stored by extracting the columns from the denoised image matrix, as indicated at step 112.

In some embodiments, one or more regions of interest in the noisy image series can be extracted to generate one or more independent spatial-temporal image matrices. These individual spatial-temporal image matrices can be independently denoised, as described above, and then combined to form a denoised image of the full field-of-view.

Figure 2:
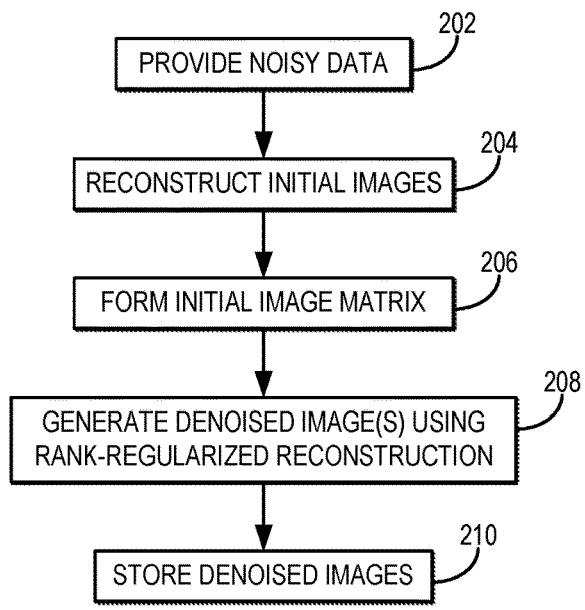
FIG. 2 is a flowchart setting forth the steps of an example method for generating one or more denoised images from a series of noisy images using a rank-regularized optimization that includes regularization functions associated with a spatial basis, one of a temporal or spectral basis, and a rank of an image matrix formed from the denoised images.

Referring now to FIG. 2, a flowchart is illustrated as setting forth the steps of an example method for reconstructing denoised images from noisy data acquired using a medical imaging system, where the denoised images are generated using a rank-regularized algorithm.

The method includes providing noisy data acquired with a medical imaging system, as indicated at step 202. In some embodiments, the noisy data is provided to a computer system by retrieving previously acquired noisy data from a data storage or the like. In some other embodiments, the noisy data is provided to a computer system by acquiring the data with a medical imaging system that is in communication with the computer system.

Noisy images of the subject are reconstructed from the noisy data, as indicated at step 204. This reconstruction can proceed using any suitable image reconstruction technique. It will be appreciated by those skilled in the art that in some embodiments, steps 202 and 204 can be skipped by instead providing to the computer system a series of already reconstructed noisy images, which may be images already stored in a data storage or the like.

An initial spatial-temporal or spatial-spectral image matrix is formed from the noisy images, as indicated at step 206, and as described above. It is a discovery of the invention that nearly all the information in a series of temporally-resolved or spectrally-resolved medical images is contained in the first several temporal or spectral bases of a spatial-temporal or spatial-spectral image matrix, respectively, while the remaining bases contain primarily noise and negligible anatomical information. Thus, the true rank of these image series is quite low. As a result, lower weights can be applied to bases that contain mostly noise to obtain denoised images of the subject. Applying these lower weights to bases that contain mostly noise can be implemented in a rank-regularized denoising algorithm, such as the one represented by the following optimization problem:

$$\tilde{X} = \arg\min_{\tilde{X}}\left\{\frac{1}{2}\|X - Y\|_F^2 + \lambda\|X\|_*\right\}; \quad (2)$$

where Y is the spatial-temporal or spatial-spectral image matrix to be denoised;

$$\|A\|_F^2 = \sum_{ij} a_{ij}^2$$

is the Frobenius norm of a matrix; $\|A\|^* = \text{trace}(\sqrt{A^*A})$ of a matrix; $\lambda$ is a parameter that controls up to which singular value will be retained in the final denoised image. It will be appreciated that the nuclear norm regularizer can be replaced by other matrix norms, such as the Schatten p-norm. It will also be appreciated that the above rank regularization can be used in conjunction with a conventional spatial filter or a temporal filter to denoise the resultant image.

In some embodiments, the rank regularization term, $\lambda\|X\|^*$, can be modified to operate on an augmented image matrix, $X_A$, which can be formed by concatenating a prior image column to the image matrix, X; namely, $X_A \equiv (X_P|X)$. The prior image, $X_P$, can be a low noise prior image generated from the combination of several image columns, or can be more than one image column with several prior images generated with different noise levels. In some embodiments, the augmented image matrix can be formed by concatenating a prior image that contains only zero values.

The noisy images are processed according to the above-described rank-regularized denoising algorithm to generate denoised images, as indicated at step 208. These denoised images can then be stored in data storage, or the like, for later display or additional processing, as indicated at step 210.

Figure 3A:
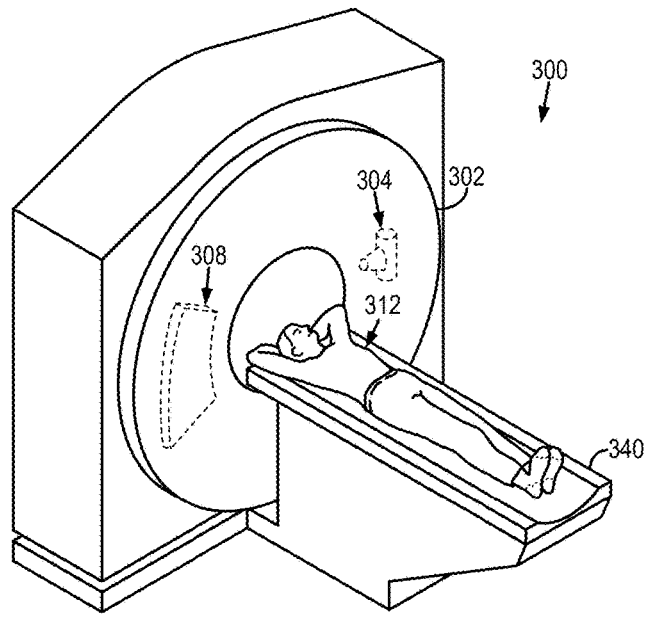
FIG. 3A illustrates an example computed tomography imaging system.
Figure 3B:
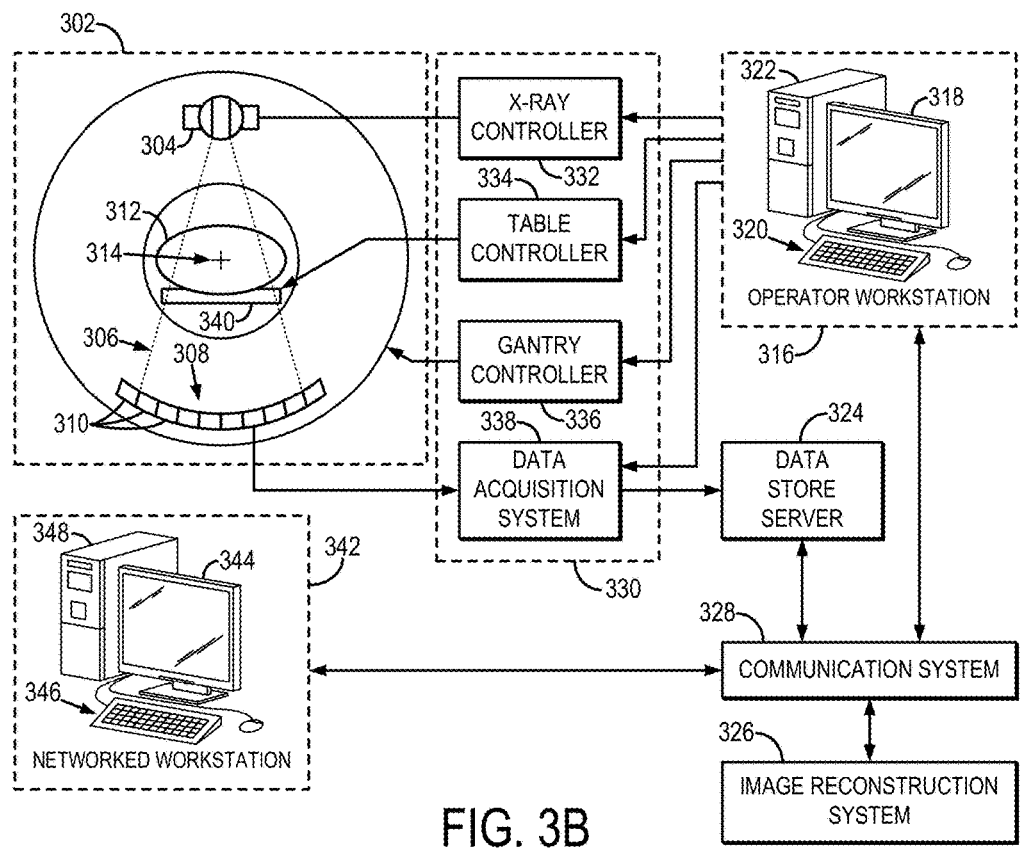
FIG. 3B is a block diagram of the example computed tomography imaging system.

Referring particularly now to FIGS. 3A and 3B, an example of an x-ray computed tomography ("CT") imaging system 300 is illustrated. The CT system includes a gantry 302, to which at least one x-ray source 304 is coupled. The x-ray source 304 projects an x-ray beam 306, which may be a fan-beam or cone-beam of x-rays, towards a detector array 308 on the opposite side of the gantry 302. The detector array 308 includes a number of x-ray detector elements 310. Together, the x-ray detector elements 310 sense the projected x-rays 306 that pass through a subject 312, such as a medical patient or an object undergoing examination, that is positioned in the CT system 300. Each x-ray detector element 310 produces an electrical signal that may represent the intensity of an impinging x-ray beam and, hence, the attenuation of the beam as it passes through the subject 312. In some configurations, each x-ray detector 310 is capable of counting the number of x-ray photons that impinge upon the detector 310. During a scan to acquire x-ray projection data, the gantry 302 and the components mounted thereon rotate about a center of rotation 314 located within the CT system 300.

The CT system 300 also includes an operator workstation 316, which typically includes a display 318; one or more input devices 320, such as a keyboard and mouse; and a computer processor 322. The computer processor 322 may include a commercially available programmable machine running a commercially available operating system. The operator workstation 316 provides the operator interface that enables scanning control parameters to be entered into the CT system 300. In general, the operator workstation 316 is in communication with a data store server 324 and an image reconstruction system 326. By way of example, the operator workstation 316, data store sever 324, and image reconstruction system 326 may be connected via a communication system 328, which may include any suitable network connection, whether wired, wireless, or a combination of both. As an example, the communication system 328 may include both proprietary or dedicated networks, as well as open networks, such as the internet.

The operator workstation 316 is also in communication with a control system 330 that controls operation of the CT system 300. The control system 330 generally includes an x-ray controller 332, a table controller 334, a gantry controller 336, and a data acquisition system 338. The x-ray controller 332 provides power and timing signals to the x-ray source 304 and the gantry controller 336 controls the rotational speed and position of the gantry 302. The table controller 334 controls a table 340 to position the subject 312 in the gantry 302 of the CT system 300.

The DAS 338 samples data from the detector elements 310 and converts the data to digital signals for subsequent processing. For instance, digitized x-ray data is communicated from the DAS 338 to the data store server 324. The image reconstruction system 326 then retrieves the x-ray data from the data store server 324 and reconstructs an image therefrom. The image reconstruction system 326 may include a commercially available computer processor, or may be a highly parallel computer architecture, such as a system that includes multiple-core processors and massively parallel, high-density computing devices. Optionally, image reconstruction can also be performed on the processor 322 in the operator workstation 316. Reconstructed images can then be communicated back to the data store server 324 for storage or to the operator workstation 316 to be displayed to the operator or clinician.

The CT system 300 may also include one or more networked workstations 342. By way of example, a networked workstation 342 may include a display 344; one or more input devices 346, such as a keyboard and mouse; and a processor 348. The networked workstation 342 may be located within the same facility as the operator workstation 316, or in a different facility, such as a different healthcare institution or clinic.

The networked workstation 342, whether within the same facility or in a different facility as the operator workstation 316, may gain remote access to the data store server 324 and/or the image reconstruction system 326 via the communication system 328. Accordingly, multiple networked workstations 342 may have access to the data store server 324 and/or image reconstruction system 326. In this manner, x-ray data, reconstructed images, or other data may be exchanged between the data store server 324, the image reconstruction system 326, and the networked workstations 342, such that the data or images may be remotely processed by a networked workstation 342. This data may be exchanged in any suitable format, such as in accordance with the transmission control protocol ("TCP"), the internet protocol ("IP"), or other known or suitable protocols.

Figure 4:
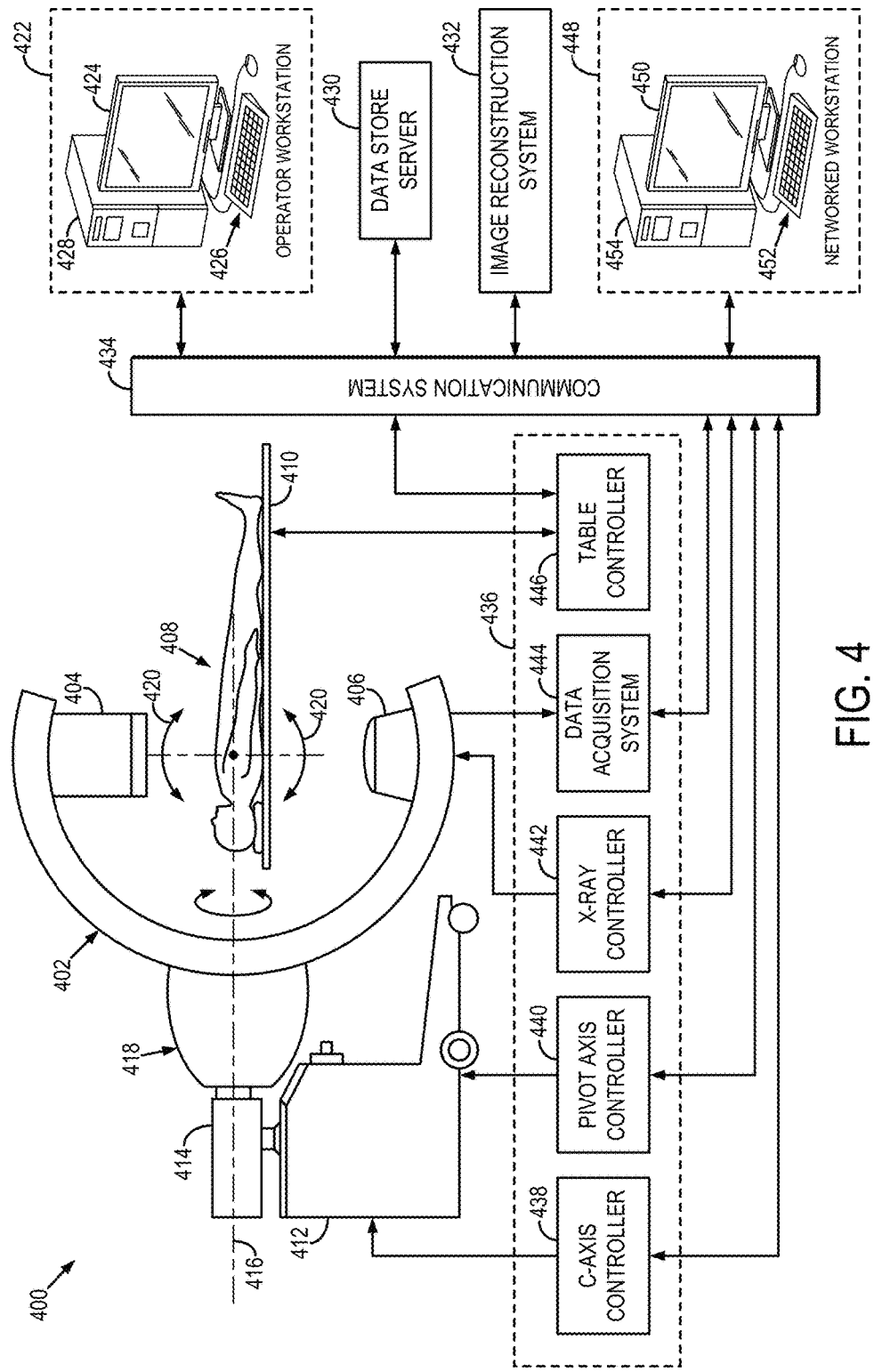
FIG. 4 is a block diagram of an example C-arm x-ray imaging system.

Referring particularly to FIG. 4, an example of a so-called "C-arm" x-ray imaging system 400 is illustrated for use in accordance with some embodiments of the present invention. Such an imaging system is generally designed for use in connection with interventional procedures. The C-arm x-ray imaging system 400 includes a gantry 402 having a C-arm to which an x-ray source assembly 404 is coupled on one end and an x-ray detector array assembly 406 is coupled at its other end. The gantry 402 enables the x-ray source assembly 404 and detector array assembly 406 to be oriented in different positions and angles around a subject 408, such as a medical patient or an object undergoing examination, that is positioned on a table 410. When the subject 408 is a medical patient, this configuration enables a physician access to the subject 408.

The x-ray source assembly 404 includes at least one x-ray source that projects an x-ray beam, which may be a fan-beam or cone-beam of x-rays, towards the x-ray detector array assembly 406 on the opposite side of the gantry 402. The x-ray detector array assembly 406 includes at least one x-ray detector, which may include a number of x-ray detector elements. Examples of x-ray detectors that may be included in the x-ray detector array assembly 406 include flat panel detectors, such as so-called "small flat panel" detectors, in which the detector array panel may be around 20×20 centimeters in size. Such a detector panel allows the coverage of a field-of-view of approximately twelve centimeters.

Together, the x-ray detector elements in the one or more x-ray detectors housed in the x-ray detector array assembly 406 sense the projected x-rays that pass through a subject 408. Each x-ray detector element produces an electrical signal that may represent the intensity of an impinging x-ray beam and, thus, the attenuation of the x-ray beam as it passes through the subject 408. In some configurations, each x-ray detector element is capable of counting the number of x-ray photons that impinge upon the detector. During a scan to acquire x-ray projection data, the gantry 402 and the components mounted thereon rotate about an isocenter of the C-arm x-ray imaging system 400.

The gantry 402 includes a support base 412. A support arm 414 is rotatably fastened to the support base 412 for rotation about a horizontal pivot axis 416. The pivot axis 416 is aligned with the centerline of the table 410 and the support arm 414 extends radially outward from the pivot axis 416 to support a C-arm drive assembly 418 on its outer end. The C-arm gantry 402 is slidably fastened to the drive assembly 418 and is coupled to a drive motor (not shown) that slides the C-arm gantry 402 to revolve it about a C-axis, as indicated by arrows 420. The pivot axis 416 and C-axis are orthogonal and intersect each other at the isocenter of the C-arm x-ray imaging system 400, which is indicated by the black circle and is located above the table 410.

The x-ray source assembly 404 and x-ray detector array assembly 406 extend radially inward to the pivot axis 416 such that the center ray of this x-ray beam passes through the system isocenter. The center ray of the x-ray beam can thus be rotated about the system isocenter around either the pivot axis 416, the C-axis, or both during the acquisition of x-ray attenuation data from a subject 408 placed on the table 410. During a scan, the x-ray source and detector array are rotated about the system isocenter to acquire x-ray attenuation projection data from different angles. By way of example, the detector array is able to acquire thirty projections, or views, per second.

The C-arm x-ray imaging system 400 also includes an operator workstation 422, which typically includes a display 424; one or more input devices 426, such as a keyboard and mouse; and a computer processor 428. The computer processor 428 may include a commercially available programmable machine running a commercially available operating system. The operator workstation 422 provides the operator interface that enables scanning control parameters to be entered into the C-arm x-ray imaging system 400. In general, the operator workstation 422 is in communication with a data store server 430 and an image reconstruction system 432. By way of example, the operator workstation 422, data store sever 430, and image reconstruction system 432 may be connected via a communication system 434, which may include any suitable network connection, whether wired, wireless, or a combination of both. As an example, the communication system 434 may include both proprietary or dedicated networks, as well as open networks, such as the internet.

The operator workstation 422 is also in communication with a control system 436 that controls operation of the C-arm x-ray imaging system 400. The control system 436 generally includes a C-axis controller 438, a pivot axis controller 440, an x-ray controller 442, a data acquisition system ("DAS") 444, and a table controller 446. The x-ray controller 442 provides power and timing signals to the x-ray source assembly 404, and the table controller 446 is operable to move the table 410 to different positions and orientations within the C-arm x-ray imaging system 400.

The rotation of the gantry 402 to which the x-ray source assembly 404 and the x-ray detector array assembly 406 are coupled is controlled by the C-axis controller 438 and the pivot axis controller 440, which respectively control the rotation of the gantry 402 about the C-axis and the pivot axis 416. In response to motion commands from the operator workstation 422, the C-axis controller 438 and the pivot axis controller 440 provide power to motors in the C-arm x-ray imaging system 400 that produce the rotations about the C-axis and the pivot axis 416, respectively. For example, a program executed by the operator workstation 422 generates motion commands to the C-axis controller 438 and pivot axis controller 440 to move the gantry 402, and thereby the x-ray source assembly 404 and x-ray detector array assembly 406, in a prescribed scan path.

The DAS 444 samples data from the one or more x-ray detectors in the x-ray detector array assembly 406 and converts the data to digital signals for subsequent processing. For instance, digitized x-ray data is communicated from the DAS 444 to the data store server 430. The image reconstruction system 432 then retrieves the x-ray data from the data store server 430 and reconstructs an image therefrom. The image reconstruction system 430 may include a commercially available computer processor, or may be a highly parallel computer architecture, such as a system that includes multiple-core processors and massively parallel, high-density computing devices. Optionally, image reconstruction can also be performed on the processor 428 in the operator workstation 422. Reconstructed images can then be communicated back to the data store server 430 for storage or to the operator workstation 422 to be displayed to the operator or clinician.

The C-arm x-ray imaging system 400 may also include one or more networked workstations 448. By way of example, a networked workstation 448 may include a display 450; one or more input devices 452, such as a keyboard and mouse; and a processor 454. The networked workstation 448 may be located within the same facility as the operator workstation 422, or in a different facility, such as a different healthcare institution or clinic.

The networked workstation 448, whether within the same facility or in a different facility as the operator workstation 422, may gain remote access to the data store server 430, the image reconstruction system 432, or both via the communication system 434. Accordingly, multiple networked workstations 448 may have access to the data store server 430, the image reconstruction system 432, or both. In this manner, x-ray data, reconstructed images, or other data may be exchanged between the data store server 430, the image reconstruction system 432, and the networked workstations 448, such that the data or images may be remotely processed by the networked workstation 448. This data may be exchanged in any suitable format, such as in accordance with the transmission control protocol ("TCP"), the Internet protocol ("IP"), or other known or suitable protocols.

Figure 5:
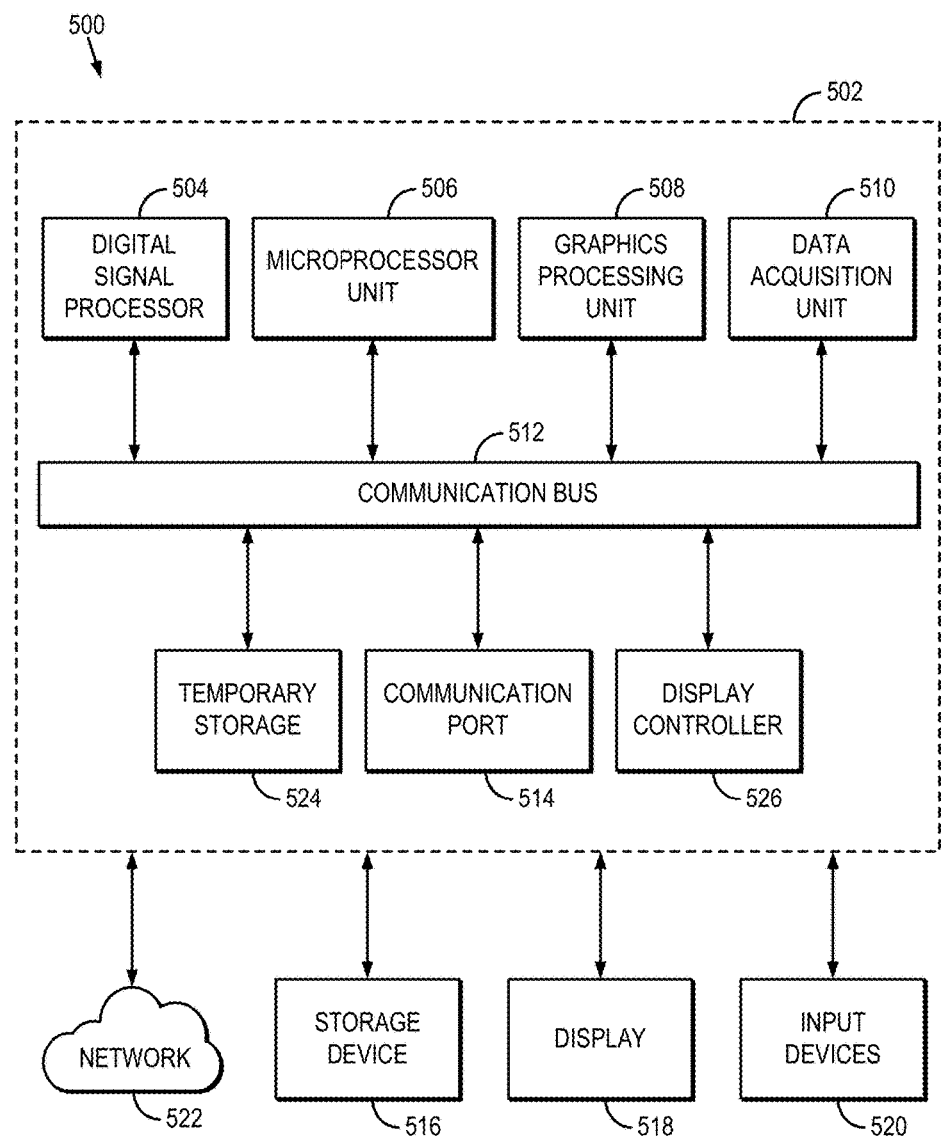
FIG. 5 is a block diagram of an example computer system that can implement the methods described here.

Referring now to FIG. 5, a block diagram of an example computer system 500 that can be configured to implement the methods for denoising medical images, is illustrated. Data, such as noisy medical images or their associated data, can be provided to the computer system 500 from a data storage device, and these data are received in a processing unit 502.

In some embodiments, the processing unit 502 can include one or more processors. As an example, the processing unit 502 may include one or more of a digital signal processor ("DSP") 504, a microprocessor unit ("MPU") 506, and a graphics processing unit ("GPU") 508. The processing unit 502 can also include a data acquisition unit 510 that is configured to electronically receive data to be processed. The DSP 504, MPU 506, GPU 508, and data acquisition unit 510 are all coupled to a communication bus 512. As an example, the communication bus 512 can be a group of wires, or a hardwire used for switching data between the peripherals or between any component in the processing unit 502.

The DSP 504 can be configured to implement the methods described here. The MPU 506 and GPU 508 can also be configured to implement the methods described here in conjunction with the DSP 504. As an example, the MPU 506 can be configured to control the operation of components in the processing unit 502 and can include instructions to implement the methods for denoising medical image on the DSP 504. Also as an example, the GPU 508 can process image graphics, such as displaying denoised medical images.

The processing unit 502 preferably includes a communication port 514 in electronic communication with other devices, which may include a storage device 516, a display 518, and one or more input devices 520. Examples of an input device 520 include, but are not limited to, a keyboard, a mouse, and a touch screen through which a user can provide an input.

The storage device 516 is configured to store data, which may include noisy medical images or their associated data acquired with a medical imaging system, whether these data are provided to or processed by the processing unit 502. The display 518 is used to display images and other information, such as denoised medical images.

The processing unit 502 can also be in electronic communication with a network 522 to transmit and receive data and other information. The communication port 514 can also be coupled to the processing unit 502 through a switched central resource, for example the communication bus 512.

The processing unit 502 can also include a temporary storage 524 and a display controller 526. As an example, the temporary storage 524 can store temporary information. For instance, the temporary storage 524 can be a random access memory.

EXAMPLE 1

Digital Subtraction Angiography

An example study implementing the methods described above for digital subtraction angiography ("DSA") applications is now discussed. In DSA data acquisitions, the same anatomical structures are repeatedly exposed to x-rays to acquire a sequence of time frames while a contrast medium is administered to the subject. The initial x-ray image time frame(s) without contrast are then subtracted from later time frames to generate angiograms.

Denoting one acquired time frame as an image column vector, $X(\vec{x}, t=t_j)$, then all the acquired time frames would form an image matrix with row indices representing the spatial coordinate and column indices representing the time frames. Performing a singular value decomposition ("SVD") on the image matrix formed of these image column vectors reveals the rank of this spatial-temporal image matrix, or alternatively, the number of linearly independent column vectors needed to effectively represent this temporal-spatial image matrix.

Figure 6:
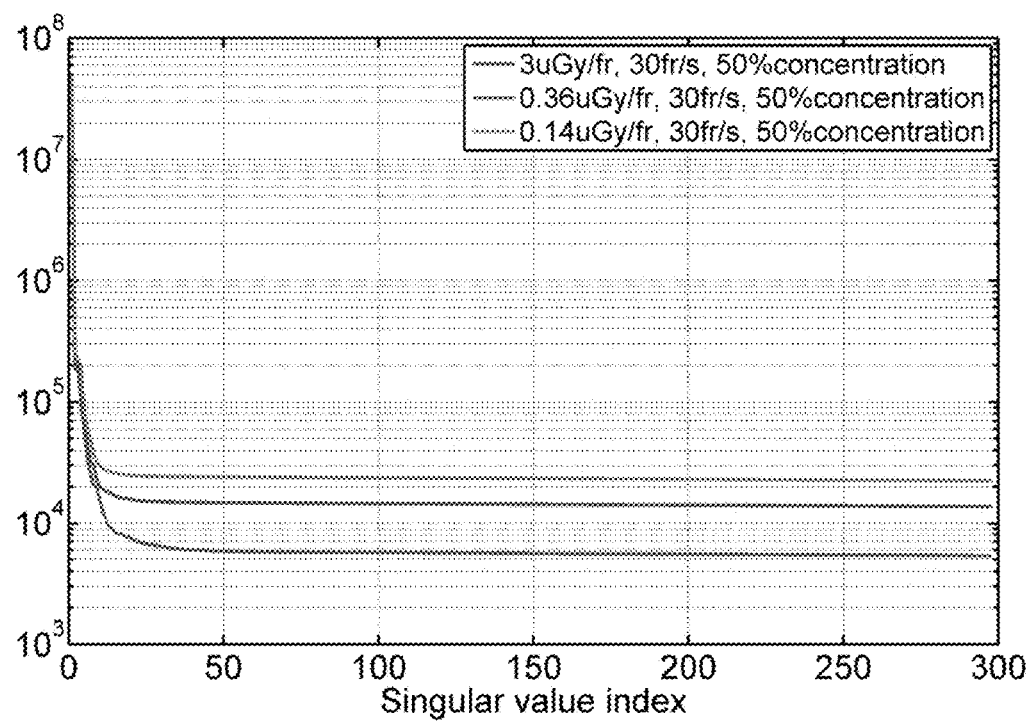
FIG. 6 is a data plot showing singular values of an example digital subtraction angiography series of images at three different x-ray dose levels.

To demonstrate the low rank nature of the DSA image sequences, in vivo DSA images from a canine animal model were acquired at three different dose settings: 3 Gy/frame, 0.36 Gy/frame, and 0.14 Gy/frame, all at 30 frames per second and 50 percent contrast concentration. SVD analysis was performed to analyze each of the DSA image sequences according to the following:

$$X(\vec{x}, t) = \sum_{i=1}^{r} \sigma_i B_i(\vec{x}, t) = \sum_{i=1}^{r} \sigma_i (\vec{u}_i(\vec{x}) \otimes \vec{v}_i^T(t)); \quad (3)$$

where the so-called singular value, $\sigma_i$, is the weight for the basis, $B_i(\vec{x} nt)$, which can be further decomposed into a spatial basis ($\vec{u}_i(\vec{x})$) and a temporal basis ($\vec{v}_i(t)$). The corresponding singular values are plotted in FIG. 6. As shown in the plot, fewer than 20 singular values are significantly larger than the others. This implies that there are only about 20 linearly independent image column basis images that are important in a given DSA image sequence, despite the several hundred image time frames acquired during an interventional procedure. In other words, a tremendous amount of redundant information is acquired in a DSA image acquisition.

Figure 7:
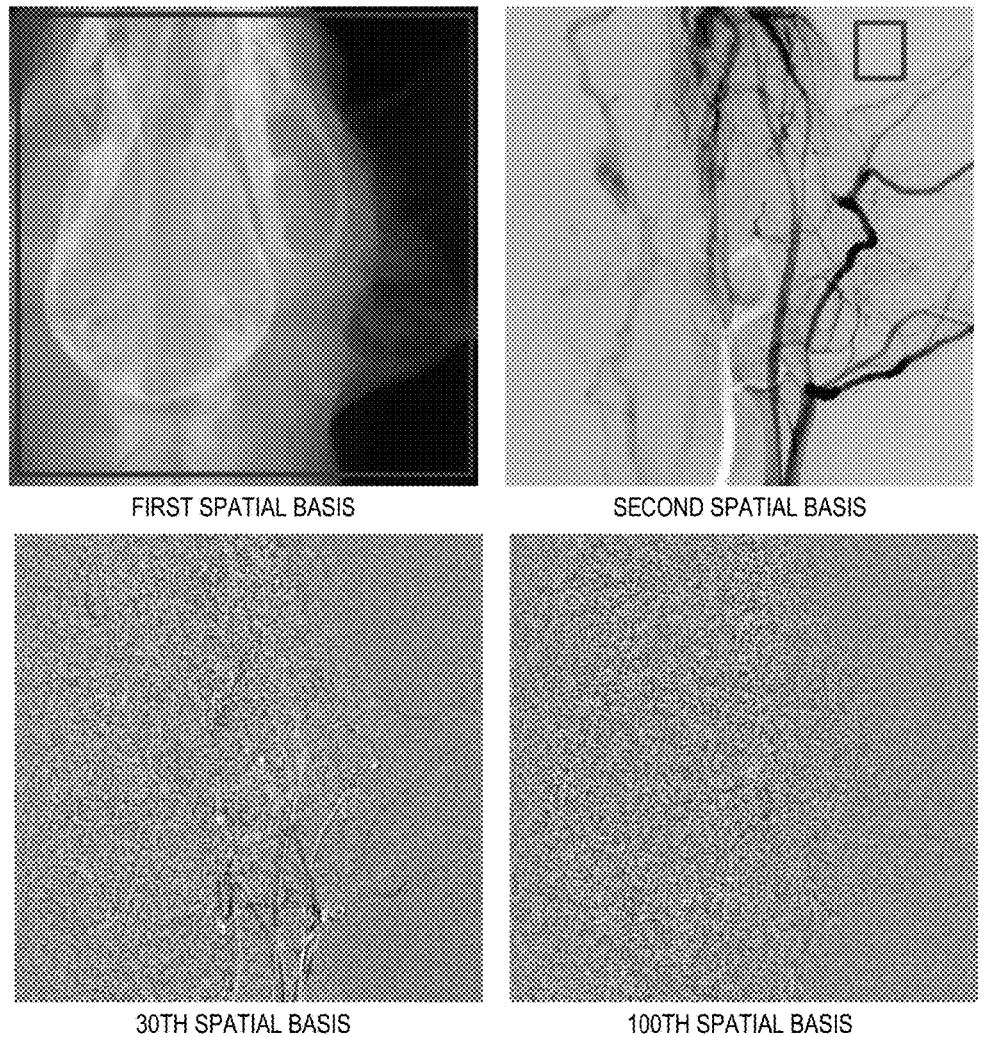
FIG. 7 illustrates example spatial basis images acquired using an x-ray imaging system in an angiographic imaging procedure and extracted from a decomposed image matrix according to embodiments of the present invention.

It is a discovery of the invention that this separation in significant singular values represents a separation of noise from anatomical structures. FIG. 7 shows the spatial content of the first, second, thirtieth, and one hundredth spatial basis images ($\vec{u}_1(\vec{x})$, $\vec{u}_2(\vec{x})$, $\vec{u}_{30}(\vec{x})$, $\vec{u}_{100}(\vec{x})$) from this example. The noise level increases dramatically with decreasing singular value.

Figure 8:
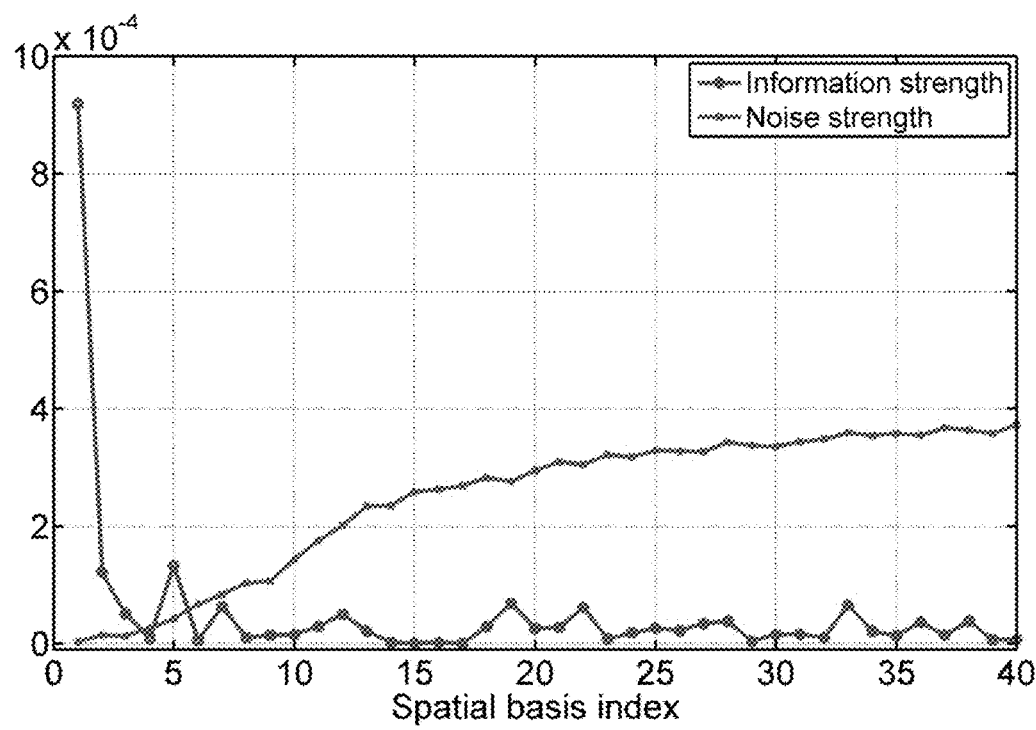
FIG. 8 is a data plot showing information strength and noise strength measurements for the first forty spatial bases in an example digital subtraction angiography series of images.

To further narrow down the important singular values and the corresponding spatial and temporal bases, the relative strength between information content and noise level was measured. The mean level of anatomical structure content was measured in a large region-of-interest enclosing all of the anatomical structures, while a small region-of-interest placed at the corner of the image was used to measure noise in a region with no anatomical structures. The values of the image content and noise content were plotted and compared against each other, as shown in FIG. 8. The plot in FIG. 8 demonstrates that image noise levels exceed information content after approximately the tenth singular value. This empirical analysis points to the low rank nature of the DSA image matrix and implies that the first several largest singular values and the corresponding spatial and temporal bases can be used to approximate the entire image matrix while rejecting noise.

The experimental analysis described above suggests that nearly all the information in a DSA image is contained in the first several temporal bases, while the remaining bases contain primarily noise and negligible anatomical information. Thus, the true rank of the DSA image series is quite low. As a result, lower weights can be applied to bases that contain mostly noise to achieve low noise DSA, thereby achieving a rank-regularized denoising algorithm. The algorithm described above with respect to Eqn. (2) was implemented in this study.

The results of this example study indicate that the denoising algorithm described above can be implemented for DSA, and enables a dramatic reduction in radiation dose, contrast agent dose, or both in DSA imaging. After applying the algorithms described above, the radiation dose for DSA can be reduced by a factor of 20 (e.g., from 3 Gy/frame to 0.14 Gy/frame) and contrast dose can be reduced by a factor of 2 while maintaining the image quality. In addition, image processing only took about one second for a ten second DSA data acquisition when implemented on a GPU.

EXAMPLE 2

Differential Phase Contrast X-Ray Imaging

Described now is an example study to investigate implementing the methods described here for denoising spatial-spectral differential phase contrast ("DPC") image datasets acquired from a Talbot-Lau interferometer bench top system. The system was equipped with a energy-resolved photon-counting detector (XC-FLITE X1, XCounter AB, Sweden). The x-ray sensor was made of CdTe-CMOS scintillation material and the detector is equipped two adjustable energy thresholds. The native image pixel size was 100 μm, but was 2-by-2 binned during the data acquisitions. A micro-focus x-ray tube (L10321, Hamamatsu Photonics K.K.) with tungsten target and adjustable focal spot size was used in the experimental setup. The tube was operated at 40 kVp and 150 μA. At 150 μA tube current, the nominal focal spot size was about 8 μm. The exposure time for each image was 20 seconds.

The Talbot-Lau interferometer included a π-phase shift grating G1 made from silicon, and an absorption grating G2 having a period of 4.8 μm. Both gratings had a duty cycle of 0.5. As designed, the interferometer system reached its peak energy response at 28 keV.

A polymethyl methacrylate (PMMA) wedge phantom was firstly imaged in this study. This phantom had an open angle of 80 degrees. The constant refraction angle of this phantom provided an opportunity to evaluate the contrast-to-noise ratio ("CNR") improvements after using the denoising methods described above (e.g., implementing a rank-one approximation in this particular example). Three different image regions were quantitatively compared in this study. They corresponded to 1.5 cm, 3.5 cm, and 5.5 cm PMMA thicknesses. The second phantom included five groups of high contrast and low contrast spheres in an oil filled tube. This phantom was used to demonstrate the low contrast imaging performance of the rank-one SVD approximation methods.

Two different energy threshold setting schemes were used. The first scheme centered the energy window at 28 keV, but increasingly broadened the window until it covered the full beam spectrum. By analyzing these datasets, the optimal energy bin width that balanced the spectrum and visibility was found. In the second scheme, the full beam spectrum was equally divided into two and three consecutive energy bins. The proposed rank-one SVD approximation methods were used to reduce DPC image noises.

To demonstrate the feasibility of a low rank approximation of Eqn. (1) (e.g., a rank-1 approximation whereby r=1), the $\Sigma$ matrix and the $\vec{u}_i \otimes \vec{v}_i^T$ bases were carefully studied after SVD decompositions. Experimental results are shown in FIGS. 9A-9B and in FIG. 10.

Figures 9A, 9B:
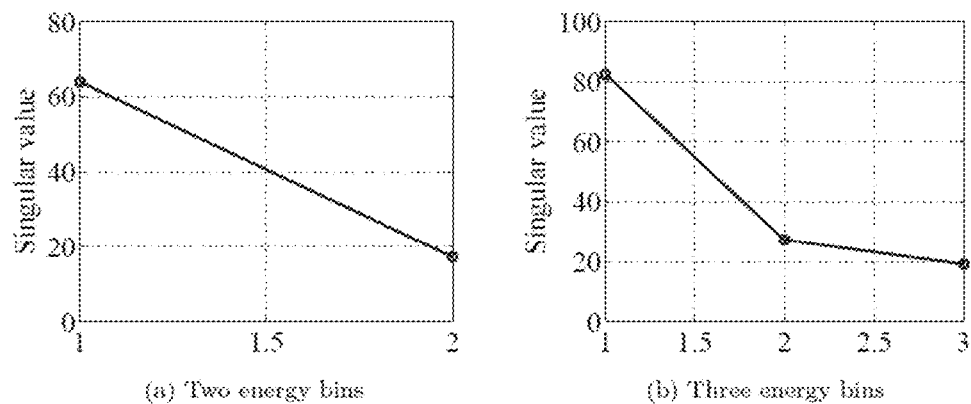
FIGS. 9A-9B are data plots showing the distribution f singular values for an example spatial-spectral image matrix formed from images acquired using a differential phase contrast x-ray imaging system.
Figure 10:
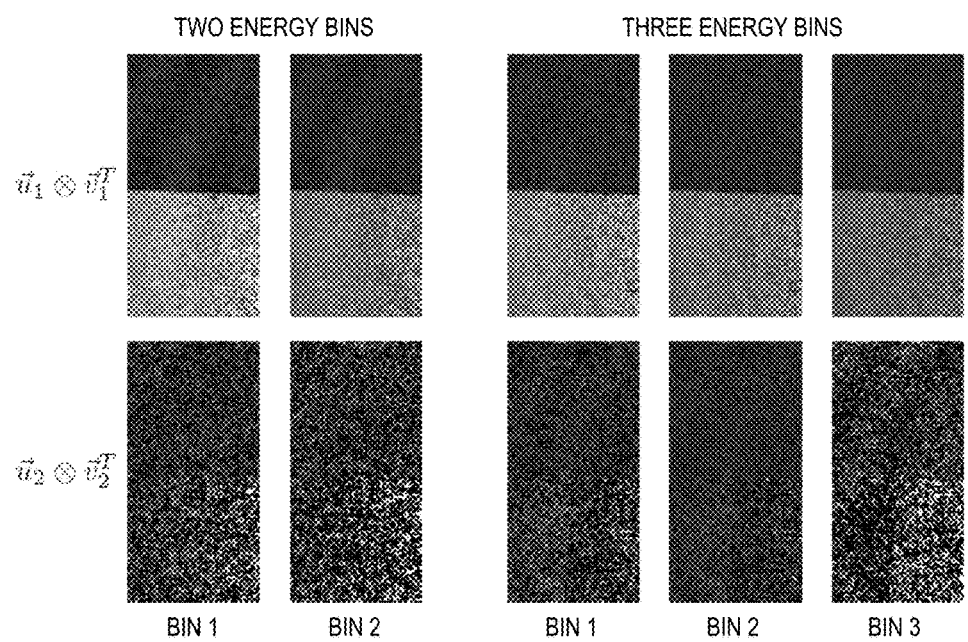
FIG. 10 illustrated example basis images acquired using differential phase contrast x-ray imaging and extracted from a decomposed image matrix according to embodiments of the present invention

As seen in FIGS. 9A and 9B, the first singular value, $\sigma_1$, is the most dominant term, which demonstrates the correctness that a rank-one assumption can be implemented in this example application. This is true for both two energy bins (FIG. 9A) and three energy bins (FIG. 9B). Because of the intrinsic rank-one property, only the first decomposition basis, $B_1(\vec{x},E) = \vec{u}_1 \otimes \vec{v}_1^T$, contains the meaningful object information, as can be seen in the first row in FIG. 10. To the contrary, the second basis image, $B_2(\vec{x},E) = \vec{u}_2 \otimes \vec{v}_2^T$, (and also for higher order image bases not shown here) barely contains valuable object information. Thus, these higher order image bases can all be treated as image noise contributors and can be removed.

Thus, this example study demonstrated that the rank-one SVD approximation techniques described above can be used to reduce image noise in DPC images, and thereby increase the object CNR, provided that an energy resolved photon-counting detector with different energy thresholds is used.

The present invention has been described in terms of one or more preferred embodiments, and it should be appreciated that many equivalents, alternatives, variations, and modifications, aside from those expressly stated, are possible and within the scope of the invention.

The invention claimed is:

1. A method for generating at least one denoised image of a subject from a series of noisy images acquired with a medical imaging system, the steps of the method comprising:
    (a) providing to a computer system, a series of noisy images reconstructed from imaging data acquired with a medical imaging system employing x-ray radiation and wherein the images include x-ray noise and anatomical information at a first contrast-to-noise ratio (CNR);
    (b) forming a noisy image matrix from the series of noisy images reconstructed from imaging data, wherein the noisy image matrix represents a first basis and a second basis;
    (c) generating a denoised image matrix with the computer by inputting the noisy image matrix to a rank-regularized optimization that iteratively minimizes a difference between a denoised image matrix and the noisy image matrix, wherein the rank-regularized optimization includes a regularization term that controls generating the denoised image matrix as a decomposition of the noisy image matrix into basis images defined by the first basis and the second basis; and
    wherein the denoised image matrix contains the at least one denoised image of the subject at a second CNR that is greater the first CNR.

2. The method as recited in claim 1, wherein the regularization term includes a regularization function that minimizes a matrix norm of the denoised image matrix.

3. The method as recited in claim 2, wherein the matrix norm is one of a nuclear norm or a Schattern p-norm.

4. The method as recited in claim 1, wherein the regularization term includes a regularization function that minimizes a matrix norm of an augmented image matrix formed by concatenating the denoised image matrix with a prior image of the subject.

5. The method as recited in claim 1, wherein each basis image in the denoised image matrix is weighted by a singular value and the regularization term in the rank regularized optimization is weighted by a parameter that controls up to which singular value will be retained in the at least one denoised image.

6. The method as recited in claim 1, wherein step (b) includes forming the noisy image matrix by vectorizing each noisy image and concatenating the noisy images into the noisy image matrix such that each column in the noisy image matrix corresponds to a different noisy image.

7. The method as recited in claim 1, wherein the first basis is a spatial basis and the second basis is a temporal basis.

8. The method as recited in claim 1, wherein step (a) includes providing data acquired with a medical imaging system to the computer system and reconstructing with the computer system, the series of noisy images from the provided data.

9. The method as recited in claim 1, further comprising filtering the at least one denoised image with at least one of a spatial filter or a temporal filter.

10. The method as recited in claim 1, further comprising filtering the series of noisy images with at least one of a spatial filter or a temporal filter.

11. A method for generating a denoised image of a subject from noisy images acquired with a medical imaging system, the steps of the method comprising:
   (a) providing to a computer system, a series of noisy images reconstructed from imaging data acquired with a medical imaging system employing x-ray radiation and wherein the images include x-ray noise and anatomical information at a first contrast-noise ratio (CNR):
   (b) forming an initial image matrix from the series of noisy images reconstructed from imaging data with the computer system by vectorizing each noisy image and concatenating the vectorized noisy images as the initial image matrix such that each column in the initial image matrix corresponds to a different one of the noisy images;
   (c) generating a decomposed image matrix with the computer system by performing a singular value decomposition on the initial image matrix, wherein the singular value decomposition decomposes the initial image matrix into a weighted sum of basis images such that each column in the decomposed image matrix corresponds to a different basis image weighted by a singular value, and wherein each basis image is represented by a Kronecker product between a first basis and a second basis; and
   (d) generating the denoised image with the computer at a second CNR that is greater than the first CNR by truncating the decomposed image matrix and storing the truncated image matrix as the denoised image.

12. The method as recited in claim 11, wherein the first basis is a spatial basis and the second basis is one of a temporal basis or a spectral basis.

13. The method as recited in claim 12, wherein the series of noisy images corresponds to a time series of image frames and the second basis is a temporal basis representative of time frames in the time series.

14. The method as recited in claim 12, wherein the series of noisy images corresponds to images acquired at different x-ray energy levels, and the second basis is a spectral basis representative of different spectral bins associated with the different x-ray energy levels.

15. The method as recited in claim 11, wherein step (d) includes truncating the decomposed image matrix to its first column.

16. The method as recited in claim 11, wherein step (d) includes retaining a number of columns in the decomposed image matrix by truncating the decomposed image matrix to that number columns and summing the retained number of columns.

17. The method as recited in claim 16, wherein the number of columns corresponds to a number of columns in the decomposed image matrix associated with singular values above a threshold value.

18. The method as recited in claim 11, wherein step (a) includes providing data acquired with a medical imaging system to the computer system and reconstructing with the computer system, the series of noisy images from the provided data.

* * * * *

UNITED STATES PATENT AND TRADEMARK OFFICE
CERTIFICATE OF CORRECTION

PATENT NO. : 10,332,281 B2
APPLICATION NO. : 15/011107
DATED : June 25, 2019
INVENTOR(S) : Guang-Hong Chen Page 1 of 1

It is certified that error appears in the above-identified patent and that said Letters Patent is hereby corrected as shown below:

In the Claims

Column 14, Line 64, "greater the" should be --greater than the--.

Column 15, Line 39, "contrast-noise" should be --contrast-to-noise--.

Signed and Sealed this
Tenth Day of September, 2019

Andrei Iancu
*Director of the United States Patent and Trademark Office*